(12) United States Patent
Goikhman et al.

(10) Patent No.: US 9,785,709 B2
(45) Date of Patent: *Oct. 10, 2017

(54) VIDEO INDEXING, SEARCH AND DELIVERY PLATFORMS, METHODS, SYSTEMS AND APPARATUSES

(71) Applicant: Unreel Entertainment LLC, Foster City, CA (US)

(72) Inventors: Daniel Goikhman, Manalapan, NJ (US); Krishna Arvapally, Foster City, CA (US); Latha Maduri Doddikadi, Foster City, CA (US); Akshay Arvapally, Edison, NJ (US)

(73) Assignee: Unreel Entertainment LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,639

(22) Filed: Mar. 13, 2017

(65) Prior Publication Data

US 2017/0206210 A1   Jul. 20, 2017

Related U.S. Application Data

(63) Continuation of application No. 15/158,775, filed on May 19, 2016, now Pat. No. 9,594,834, which is a
(Continued)

(51) Int. Cl.
*H04N 5/445* (2011.01)
*G06F 17/30* (2006.01)
(Continued)

(52) U.S. Cl.
CPC ...... *G06F 17/3082* (2013.01); *G06F 17/3084* (2013.01); *G06F 17/30828* (2013.01); *G06F 17/30864* (2013.01); *G06K 9/00718* (2013.01); *H04N 21/235* (2013.01); *H04N 21/23113* (2013.01); *H04N 21/23418* (2013.01); *H04N 21/25891* (2013.01); *H04N 21/2668* (2013.01); *H04N 21/4668* (2013.01); *H04N 21/4756* (2013.01); *H04N 21/4788* (2013.01); *H04N 21/4828* (2013.01); *H04N 21/6125* (2013.01);
(Continued)

(58) Field of Classification Search
CPC ...................... H04N 5/44543; H04N 21/4532
See application file for complete search history.

(56) References Cited

U.S. PATENT DOCUMENTS

| 8,713,618 | B1 * | 4/2014 | Kuznetsov | H04L 29/06027 |
| | | | | 725/38 |
| 2012/0257876 | A1 * | 10/2012 | Gupta | G11B 27/034 |
| | | | | 386/285 |

* cited by examiner

*Primary Examiner* — Sumaiya A Chowdhury
(74) *Attorney, Agent, or Firm* — Neal J. McLaughlin; Alston & Bird LLP

(57) ABSTRACT

A video ingest, search and delivery solution is provided in which videos and their associated metadata are ingested based on ingest criteria. Moments in the metadata are identified by parsing comments in the metadata for comments that reference a time in the video. Moments are recorded with the referenced time and the text of the comment. Videos are rated and may be delivered to users based at least in part on the rating. Moments may be displayed together with the video by displaying the text of moments at the associated time in the video as the video is being delivered. The text of moment records may be searched based on search parameters received form a user to identify videos to deliver to the user.

17 Claims, 5 Drawing Sheets

Related U.S. Application Data continuation of application No. 14/925,262, filed on Oct. 28, 2015, now Pat. No. 9,348,909.

(60) Provisional application No. 62/220,341, filed on Sep. 18, 2015.

(51) Int. Cl.
| | |
|---|---|
| *H04N 21/61* | (2011.01) |
| *H04N 21/235* | (2011.01) |
| *H04N 21/234* | (2011.01) |
| *H04N 21/2668* | (2011.01) |
| *H04N 21/475* | (2011.01) |
| *H04N 21/4788* | (2011.01) |
| *H04N 21/482* | (2011.01) |
| *H04N 21/81* | (2011.01) |
| *H04N 21/84* | (2011.01) |
| *H04N 21/466* | (2011.01) |
| *H04N 21/231* | (2011.01) |
| *G06K 9/00* | (2006.01) |
| *H04N 21/258* | (2011.01) |

(52) U.S. Cl.
CPC ......... *H04N 21/8133* (2013.01); *H04N 21/84* (2013.01); *G06K 2009/00738* (2013.01)

VIDEO INDEXING, SEARCH AND DELIVERY PLATFORMS, METHODS, SYSTEMS AND APPARATUSES

CROSS-REFERENCE TO RELATED APPLICATIONS

This application is a continuation of U.S. application Ser. No. 15/158,775, filed May 19, 2016 and issuing as U.S. Pat. No. 9,594,834, which is a continuation of U.S. application Ser. No. 14/925,262, filed Oct. 28, 2015 and issuing as U.S. Pat. No. 9,348,909, which claims the benefit of U.S. Provisional Application No. 62/220,341, filed Sep. 18, 2015, each of which are hereby incorporated by reference in their entireties.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address discovering and displaying videos from around the Internet, and more particularly, include VIDEO INDEXING, SEARCH AND DELIVERY ("VISD") PLATFORMS, APPARATUSES, METHODS AND SYSTEMS.

The Internet has developed over the past decades from being a source of information to now also being a source of entertainment. One of the major factors influencing this development has been the increases in computing power and data transmission bandwidth available to consumers at reasonable prices. An inexpensive tablet computer now has a video processing capability that once required a room of expensive, highly specialized equipment to provide. Similarly, the bandwidth of data transmission over the Internet available to consumer devices now even over cellular data networks exceeds by orders of magnitude what was available with prior, astronomically expensive, cutting edge optical networks.

With the development of the Internet towards fulfilling entertainment needs, a parallel development has been underway with respect to content creation. Beginning with the handful of over-the-air television networks that once produced the vast majority of entertainment content, consumers enjoyed a significant increase in content variety with the advent of cable and satellite television. As Internet connection bandwidth and computing power reasonably available to consumers developed to a point where video content could be reliably consumed from Internet sources, consumers experienced a nearly limitless expansion of entertainment content available to them. Internet content production had none of the restraints previously imposed by television, meaning that anyone had the ability to produce content of any type from anywhere they had an Internet connection. However, the fact that there are limitless choices in content presents the consumer with the work of wading through that content in order to find content they would like to consume.

The Internet also developed from its early days as a means of social interaction amongst users. Early examples of social interaction enabled by the Internet include list-servs, chatrooms, instant messaging and email. Later, online social networks developed as a more public and permanent means of social interaction. Early examples included MySpace and Facebook.

Eventually, entertainment content and social networks became more and more inter-related. Internet users found social networks as a natural outlet to share their opinions and commentary on entertainment content found on those social networks and elsewhere on the Internet. Other users' opinions and commentary also served as a helpful tool for users trying to sift through the vast amount of content available on the Internet to find content that they would like to consume. However, there still is a lot of work required of users to parse the now vast amount of social feedback on equally vast content options available to them, not to mention that social feedback and content are now available from hundreds or thousands of primary sources.

Accordingly, the present inventions attempt to provide tools to allow users to enjoy the great content available on the Internet without the significant amount of work it currently takes to find, vet and consume that content.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. §112.

BRIEF SUMMARY

The present innovations generally address discovering and displaying videos from around the Internet. In general, in one embodiment, a video ingest, search and delivery solution is provided in which videos and their associated metadata are ingested based on ingest criteria. Moments in the metadata are identified by parsing comments in the metadata for comments that reference a time in the video. Moments are recorded with the referenced time and the text of the comment. Videos are rated and may be delivered to users based at least in part on the rating. Moments may be displayed together with the video by displaying the text of moments at the associated time in the video as the video is being delivered. The text of moment records may be searched based on search parameters received form a user to identify videos to deliver to the user.

In general, in one embodiment, a method for ingesting and delivering video comprises crawling one or more predetermined video reference sources and selectively ingesting one or more videos and their metadata based on predetermined ingest criteria, analyzing the ingested videos to identify moments in the video by parsing comments relating to the video, identifying a moment if a comment includes a reference to a time in the video and storing the time and a text of the comment in a record of the moment, rating the video according to predetermined rating factors, selectively delivering videos based on at least one of (a) results of the analyzing step, (b) results of the rating step, or (c) video metadata, and displaying moments together with the delivered videos by displaying text of a particular moment at the time of the particular moment as the video is delivered.

In some implementations, the predetermined rating factors include at least the total number of moments identified for the video or the total number of comments for the video.

In some implementations, the method also includes after a video and its metadata is first ingested, ingesting additional metadata for the video that is dated after a last time that metadata was ingested for the video.

In some implementations, the method also includes identifying additional moments in the additional metadata, identifying an additional moment if a comment in the additional metadata includes a reference to a time in the video and storing the time and a text of such a comment in a record of the additional moment.

In some implementations, the method also includes comparing the time, the text and an identification of a user associated with a comment in the additional metadata with already stored records of moments and only storing a new moment corresponding to the comment in the additional metadata if there is no match.

In some implementations, the method also includes rating the video after ingesting the additional metadata based on all metadata ingested for the video.

In some implementations, the predetermined ingest criteria include at least whether at least one comment at one of a predetermined set of one or more reference sources contains a reference to a time in a video.

In general, in another embodiment, a method for ingesting and delivering video comprises crawling one or more predetermined video reference sources and selectively ingesting one or more videos and their metadata based on predetermined ingest criteria, analyzing the ingested videos to identify moments in the video by parsing comments relating to the video, identifying a moment if a comment includes a reference to a time in the video and storing the time and a text of the comment in a record of the moment, rating the video according to predetermined rating factors, searching at least the text of moment records based on search parameters received from a user, selectively delivering videos based on the results of the searching step in order of their rating as determined by the rating step.

In some implementations, the method also includes recording user activity data related to the user's activity with respect to one or more ingested videos and wherein the rating step includes at least comparing metadata of the video to the user's activity data.

In some implementations, the user activity data includes data indicating previous search parameters received from the user and the rating step includes at least comparing metadata of the video to previous search parameters received from the user.

In some implementations, the ingested metadata includes a title for each video and a description for each video, the title and description being maintained by a third party location from which the video and its metadata are ingested and the searching step also includes searching the titles and keywords associate with ingested videos based on the search parameters received from the user.

In some implementations, the method also includes after a video and its metadata is first ingested, ingesting additional metadata for the video that is dated after a last time that metadata was ingested for the video.

In some implementations, the method also includes identifying additional moments in the additional metadata, identifying an additional moment if a comment in the additional metadata includes a reference to a time in the video and storing the time and a text of such a comment in a record of the additional moment.

In some implementations, the method also includes rating the video after ingesting the additional metadata based on all metadata ingested for the video.

In some implementations, the method also includes storing the search parameters received from the user as a channel and, in response to the receipt of a selection of a channel from a user, searching at least the text of moment records based on search parameters stored in association with the channel.

In some implementations, the method also includes identifying additional moments in the additional metadata, identifying an additional moment if a comment in the additional metadata includes a reference to a time in the video and storing the time and a text of such a comment in a record of the additional moment, re-rating the video after ingesting the additional metadata based on all metadata ingested for the video, storing the search parameters received from the user as a channel, in response to the receipt of a selection of a channel from a user, re-searching at least the text of moment records and the additional moment records based on search parameters stored in association with the channel, and selectively delivering videos based on the results of the re-searching step in order of their rating as determined by the re-rating step.

BRIEF DESCRIPTION OF THE DRAWINGS

The accompanying drawings illustrate various non-limiting, example, innovative aspects in accordance with the present descriptions.

DETAILED DESCRIPTION

Embodiments of VISD platforms, methods, systems and apparatuses are described herein. While aspects of the described VISD platforms, methods, systems and apparatuses can be implemented in any number of different configurations, the embodiments are described in the context of the following exemplary configurations. The descriptions and details of well-known components and structures are omitted for simplicity of the description.

The description and figures merely illustrate exemplary embodiments of the inventive VISD platforms, methods, systems and apparatuses. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 1:
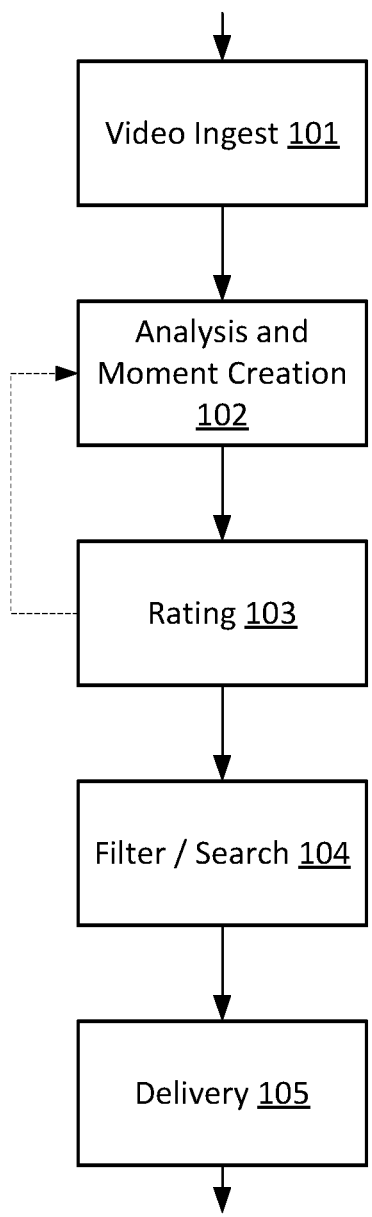
FIG. 1 shows a flow chart of a general VISD work flow.

FIG. 1 shows a flow chart of a general VISD work flow. Videos and their metadata are first ingested into the platform 101, analyzed for content and moment creation 102, rated according to various metrics 103, filtered or searched according to user input and/or other criteria 104 and finally video is delivered to a user 105 for their enjoyment. The analysis 102 and rating 103 aspects of the work flow may be performed continuously, at predetermined intervals, or in response to a manual or predefined, data-triggered prompts and may include the ingest of additional metadata. Similarly, the entire work flow depicted in FIG. 1 may be performed continuously, at predetermined intervals, or in response to a manual or predefined, data-triggered prompts and may include the ingest of additional videos and metadata. Each of the work flow aspects depicted in FIG. 1 will be described in greater detail below.

Ingest

Figure 2:
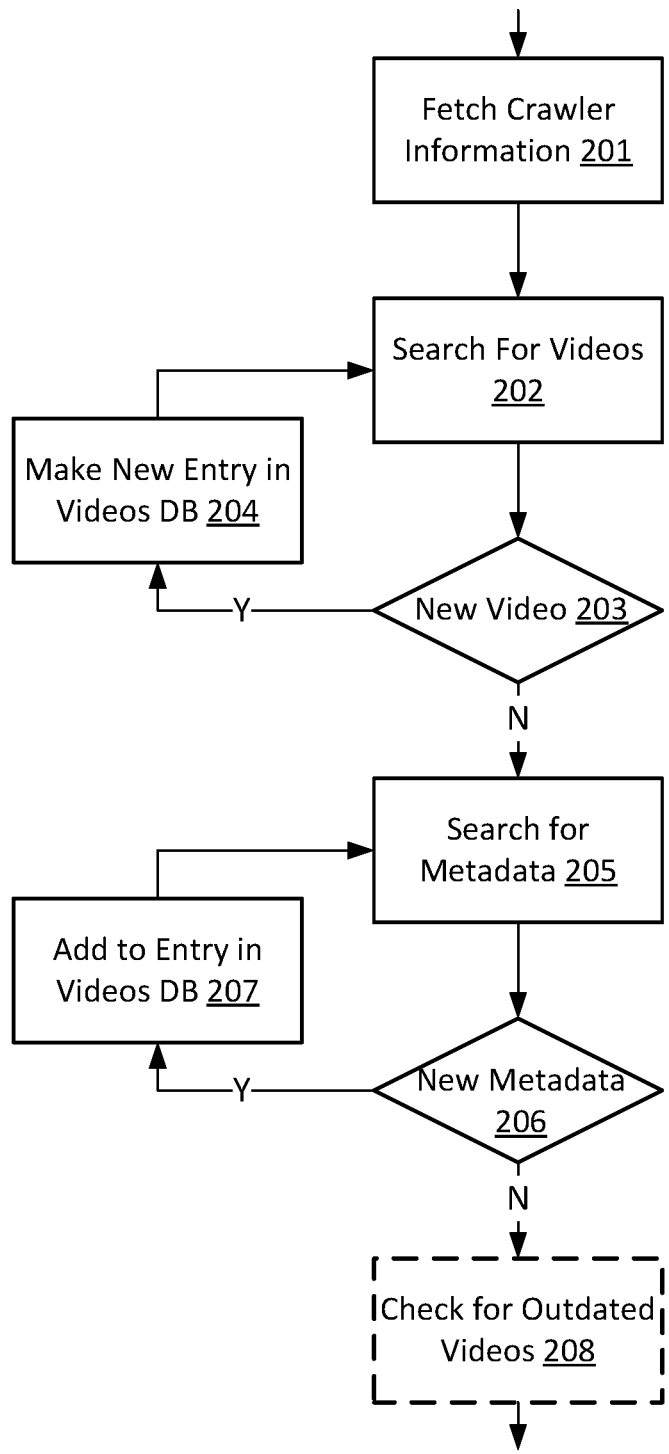
FIG. 2 shows an exemplary flow chart of a video and metadata ingest work flow of the VISD system.

Videos from various sites on the Internet may be ingested into the VISD system. FIG. 2 shows an exemplary flow chart of a video and metadata ingest work flow of the VISD system. This work flow may be accomplished by, for example, an ingest component 541 and a crawler component 542. The criteria for which sites or sources, and which videos from those sites or sources are ingested are configurable according to users' preferences and/or according to an administrator's control. These ingest criteria are stored in a crawler configuration database 519a and are fetched at the beginning of an ingest process 201. The ingest criteria are applied when searching for new videos 202.

Exemplary ingest criteria may include source information for identifying locations or websites where video searching may be performed, such as, for example, a particular web page that includes one or more listings of videos (such as www.reddit.com/r/videos), particular channels or other groupings of video content established by third party video sources (such as a particular YouTube channel), and other filters on third party content (such as a criteria that an ingest video candidate must be referenced by a link to a known video hosting site within a Tweet—i.e. a Tweet that includes a YouTube link).

Ingest criteria may also include criteria for attributes of videos, which may be source specific. For example, a criteria for ingesting a particular video may be that the video is one of the top 10 (of course other numbers may be used) most popular, viewed, and/or commented about videos at that source. As another example, a criteria for ingesting a particular video referenced in a Tweet may be that the Tweet that references the video includes a trending hashtag where the determination of which hashtags are trending is made by Twitter. As a related example, an ingest criteria for a video hosted by or linked to by Facebook may be that a video is included in a post or page that is relevant to a trending topic where the determination of which topics are trending is made by Facebook. Alternatively, a video source that is identified in the crawler configuration database 519a may have no attribute criteria relevant to it, in which case every video referenced at that source (for example a particular YouTube Channel) will be ingested. For Reddit posts, an ingest criteria may be based on a post's relative rank in a subreddit's various views. For example, a post referencing a video may be required to be in the top 10 of all posts in the /r/videos subreddit in the "Hot" view or the "Rising" view of that subreddit for the referenced video to be ingested. Another ingest criteria may be that there must exist at least one comment relating to the video that qualifies or is identified as a moment, as discussed below (with respect to step 305 in FIG. 3, for example).

The crawler configuration database 519a may also include criteria describing where a referenced video file may be located. For example, a criteria for a video may be that it is located at YouTube or Vimeo. In this example, a video may meet this criteria even if it first became known to the VISD system through a link on the www.reddit.com/r/videos site or through a trending Tweet, so long as the referenced video itself (and not necessarily the reference) is located at YouTube or Vimeo.

In addition to possibly including references to video sources where multiple videos may be located, the crawler configuration database 519a may also include references to particular videos. These references, like the references to video sources where multiple videos may be located may be entered manually by a user or an administrator or may be automatically generated based on user activity information 519f or based on some other consideration.

At step 203, it is determined whether a video that meets the ingest criteria is new. As shown in FIG. 2, each time a new video meeting the ingest criteria is identified, an entry is made 204 in the videos database 519b. Each new video may be assigned a VISD unique identifier ("UID") that is unique for each video ingested into the VISD system. Third party video sources also often maintain a unique identifier for each of the videos they host. Thus, when making a new entry in the videos database 204 when a new video is ingested, a record of the third party UID may be recorded in the database entry in connection with the VISD UID. As mentioned above, video locations may be limited to a predefined group of permissible sources. This group may be selected or limited to only sources which maintain a third party UID accessible to the VISD system. Accordingly, when a video is identified as having met the ingest criteria, checking whether the video is new may entail simply checking the videos database 519b to see whether the potentially new video is already listed in the videos database by its third party UID.

It will be apparent that it may be the case that the same video could meet the ingest criteria but be located at different permissible third party video locations. In this case, in order to eliminate duplicate videos from the VISD system, a de-duplication process may be executed to disallow later-ingested copies of a video or may add the later-ingested third party video UIDs to the already existing corresponding video entry in the videos database 519b.

At step 205, the third-party video locations, video reference sources and other information sources are polled for metadata about the ingested videos. This polling may be facilitated, for example, through the use of an Application Programming Interface ("API"). Metadata is any information about a video. Metadata may be obtained from many different sources, including the site where the video is located, the source of the original reference to the video that caused the video to be ingested and any other source that has information about the video.

Different third party video locations may maintain different types of metadata about videos. For example, metadata available to and ingested by the VISD system for a YouTube video may include the title of the video; the uploader's description of the video; the YouTube UID; the YouTube category of the video; a YouTube channel ID if the video is found in a YouTube channel; a thumbnail, screenshot or other asset related to the video; a publication date of the video; any YouTube tags or keywords entered by the uploader; and analytics about the video such as the number of likes, dislikes, favorites, views, and comments.

As another example, if a video was originally ingested due to a reference on a Reddit site, step 205 may include obtaining metadata from the Reddit site that includes, for example, the title of the Reddit post in which the video was referenced that caused the video to be ingested, the number of comments on the referencing post, the number of up and down votes for the referencing post, the time of the referencing post, etc. In addition to metadata about the referencing post itself, other metadata may be collected from Reddit including, for example, the number of all posts linking to the ingested video (in addition to the post that caused the video to be ingested), the collective number of comments on all posts referencing the video, the collective number of up and down votes on all posts referencing the video, etc.

As yet another example, if a video was originally ingested due to a reference in a Tweet, step 205 may include obtaining metadata from Twitter including any hashtags that were trending and included in the Tweet that caused the video to be ingested, other hashtags in the referencing tweet, the number of retweets of the referencing Tweet, the time of the referencing Tweet, etc. In addition to metadata about the referencing Tweet itself, other metadata may be collected from Twitter including, for example, the number of all Tweets referencing the ingested video (in addition to the Tweet that caused the video to be ingested), the collective number of retweets of all Tweets referencing the video, etc. Similar metadata may be obtained from Facebook for videos ingested from Facebook or as a result of a referencing Facebook post or page.

Any metadata retrieved in step 206 is compared to metadata existing in the relevant entry of the videos database 519b and any new metadata is added to the relevant database entry 207. As another example, only metadata that is dated after the last time that a particular metadata source was accessed for metadata may be added to the relevant database entry 207.

At step 208, the videos database 519b may optionally be checked for outdated videos and videos found to be outdated are culled from the database or otherwise flagged in the database as being outdated. For example, circumstances that indicate a video is outdated may include if a user tries to view the video and the video is no longer available from its previous location, if the crawler component 542 attempts to search for new metadata about the video but finds that the video has been removed from its previous location, or if the video's ranking, described below, falls below a predetermined threshold. When a video is flagged as outdated, it may be removed from the videos database or, alternatively, videos that are outdated may be allowed to remain in the videos database 519b even after they become outdated. Once flagged as outdated, a video will not be processed in the normal work flow and will not be provided to a user, however, keeping the outdated videos in the videos database 519b may provide the benefit that newly ingested reposts of old videos may be detected as such as described above and processed accordingly. For example, if an outdated video is ingested as a repost, this may cause the outdated flag to be removed and the video to reenter the normal work flow as described below.

Analysis and Moment Creation

Figure 3:
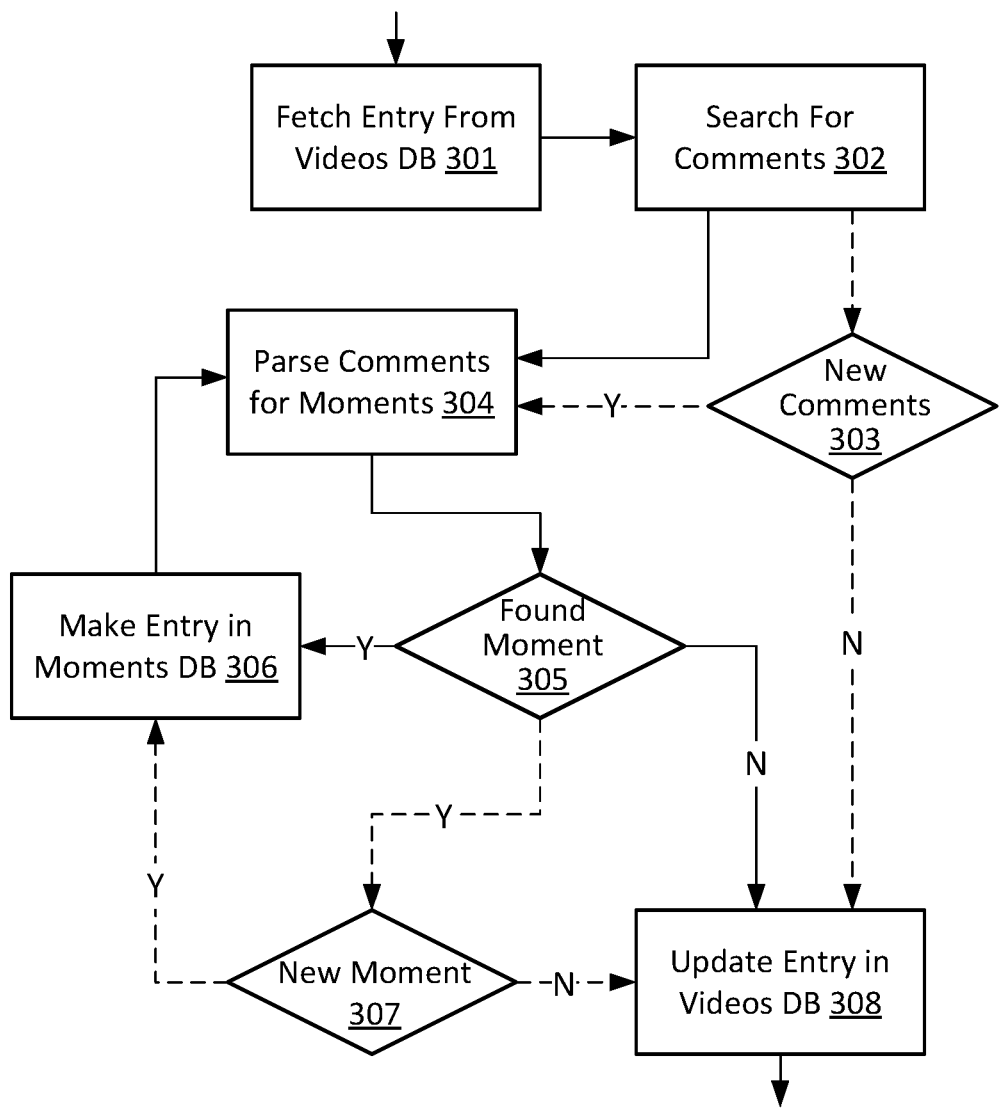
FIG. 3 shows an exemplary flow chart of a video analysis and moment creation process 102.

Referring back to FIG. 1, when videos are ingested into the VISD system 101, the content and comments about the videos are analyzed and "moments" are created based on that analysis 102. FIG. 3 shows an exemplary flow chart of a video analysis and moment creation process 102. This work flow may be accomplished by, for example, an analysis and moment creation component 543.

At step 301, entries from the videos database 519b are fetched for analysis. The entries may be fetched according to predefined criteria or based on a predefined data-driven trigger. Alternatively, the analysis 102 may occur continuously and entries may be fetched for analysis 301 continuously, one after another. For example, as shown in FIG. 3, each time an entry in the videos database 519b is analyzed, the entry is updated 308. Part of that update process 308 may be to, for example, add or update information to the videos database entry regarding the last time that that entry was analyzed. Accordingly, an exemplary predefined criteria for determining which entry from the videos database 519b to fetch at step 301 may be to fetch the entry that was analyzed the longest time ago. In a similar example, entries in the videos database 519b may include an indication of the last time that new metadata was ingested for that video 207. In this example, the next video fetched to be analyzed 301 may be the video that has new metadata since the last time the video was analyzed 102 and is the video with the most time elapsed between when the new metadata was ingested 207 and when the video was last analyzed 102.

Once fetched, the VISD system searches for comments related to the video identified by the entry in the videos database 519b in the video's metadata. A video's metadata may be obtained and refreshed using the same process as steps 205-207 described above or may be accomplished by a similar, but separate process. Examples of comments include, but are not limited to, YouTube video comments, Reddit comments on a post, Tweets, Facebook posts, replies or pages, etc. Depending on the source of the video (YouTube, Reddit, Twitter, Facebook, etc.), different comment sources may be searched. As described above, metadata for a video may indicate the source that caused the video to be ingested (e.g., a YouTube channel, a Tweet, a Reddit or Facebook post) and may also indicate the location of the video itself (e.g., YouTube, Vimeo, Facebook). When searching for comments, the VISD system may be configured to search both the source that caused the video to be ingested as well as the location of the video itself for comments about the video. In the case that the source and location are the same, (e.g. YouTube), only comments there may be searched. Alternatively, comments may be searched from other predefined comment sources in addition to the source that caused the video to be ingested and the location of the video itself. For example, if a video is referenced more than once at sources other than the source that caused the video to be ingested (as may be recorded in the video database entry by a de-duplication process, for example, as described above), comments from those additional sources may be searched as a part of step 302.

Optionally, comments may be evaluated 304 to determine whether they are new comments—i.e. they have not been parsed for moments before. This may be accomplished, for example, by storing records of comments in each entry of the videos database 519b.

At step 304, comments are parsed for "moments" according to predefined moments criteria. In one example, a moment criteria may be that a moment is identified if a comment includes a reference to a particular time in the video to which the comment pertains. For example, parsing comments according to such a moment criteria may be accomplished by examining the comment for whether any portion of the comment matches the mask "X:XX" or "X.XX" where X is a digit. In another example, parsing comments according to such a moment criteria may be accomplished by identifying whether a link to a YouTube video includes a "T=" parameter (i.e. https://youtu.be/

YYYYYYY?t=15). In one example, a moment includes the comment text together with a time referenced in the comment.

If a moment is found in a comment at step 305, the moment may optionally be compared 307 to previously found moments. This may be done, for example, by comparing the found moment to entries in the moments database 519c. In one example, the time of a found moment is compared to the times of all moment entries in the moments database 519c for the relevant video and if a moment entry is found with the same time, or a time from a moment entry already in the database 519c within a predefined window of the time of the found moment, the found moment may be considered not new. In another example, the user name or ID, VISD UID or third party UID of the relevant video, time, and comment text of a prospective moment may be compared to the same attributes of existing moment entries in the moments database 519c and if all attributes match, the prospective moment may be considered not new.

At step 306, an entry is made in the moments database 519c for a found moment. Such an entry may include the VISD UID or third party UID of the relevant video, a time, a comment text, a source of the comment, a user name or ID associated with the comment, a comment date, a number of likes the comment received, a number of replies the comment received, etc. Optionally, a censoring process may be executed on any aspect of the moment or entry in the moments database 519c to prevent the display of vulgar or profane text.

As discussed above, when there are no more moments to be added to the moments database, the entry for the relevant video in the videos database may be updated 308. Examples of the content of such an update may include the time that the moments analysis 102 was completed, the number of moments identified for the video, analytics about the popularity of the moments such as the collective number of likes or replies for all relevant moment entries in the moments database 519c, etc.

Rating

Figure 4:
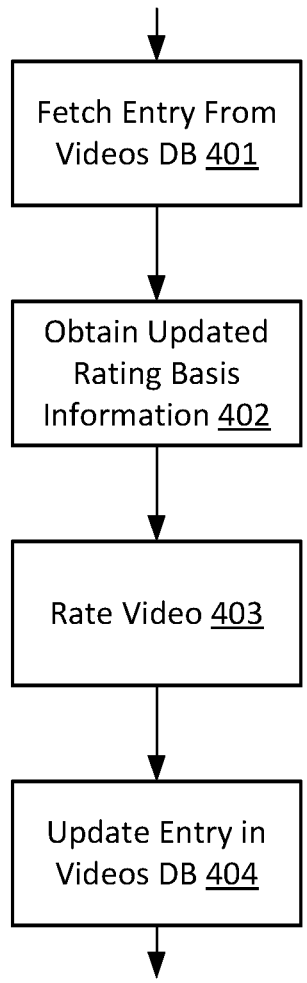
FIG. 4 shows an exemplary flow chart of a rating process 103.

For each video entry in the videos database 519b, a rating process 103 may be applied to create a video rating. FIG. 4 shows an exemplary flow chart of a rating process 103. This work flow may be accomplished by, for example, a rating component 544.

At step 401, entries from the videos database 519b are fetched for rating. The entries may be fetched according to predefined criteria or based on a predefined data-driven trigger. Alternatively, the rating 103 may occur continuously and entries may be fetched for rating 401 continuously, one after another. For example, as shown in FIG. 4, each time an entry in the videos database 519b is rated, the entry is updated 404. Part of that update process 404 may be to, for example, add or update information to the videos database entry regarding the last time that that entry was rated. Accordingly, an exemplary predefined criteria for determining which entry from the videos database 519b to fetch at step 401 may be to fetch the entry that was rated the longest time ago. In a similar example, entries in the videos database 519b may include an indication of the last time that new metadata was ingested for that video 207. In this example, the next video fetched to be rated 401 may be the video that has new metadata since the last time the video was rated 103 and is the video with the most time elapsed between when the new metadata was ingested 207 and when the video was last rated 103.

In the rating process 403, many different factors may be used to determine a video's rating. Some of those factors may exist or may be recorded within the VISD system or VISD database. Others may need to be obtained (or refreshed) from sources outside the VISD system. At step 402, outside information that may form a basis of the rating process 403 is obtained from those outside sources.

The rating process 403 may be configured according to the particular goals of the video delivery platform. For example, while the exemplary rating process described herein is intended to achieve the goals of promoting new, highly discussed videos (among other goals), it is just one potential process configuration that may be used to rate videos according to the inventions described herein. For example, other goals (such as promoting "throwback" videos, videos that have held long acclaim, videos that have become popular in a particular geographic region, etc.) may be achieved by alternative rating process configurations and parameters.

In an exemplary rating process, factors are each assigned a maximum numerical score and a cumulative sum of all scored factors determines a video's rating. Factors may include, for example, the original published date of the video (for example, the date it was first published on YouTube), factors related to the source which originally caused the video to be ingested or the location of the video, the date that the video was first ingested by the VISD system, feedback from VISD system users and factors related to the moments identified for a video. A video's rating may also be made unique to each user of the VISD system by introducing a rating factor that is based on the user's activity or preferences.

Figure 6:
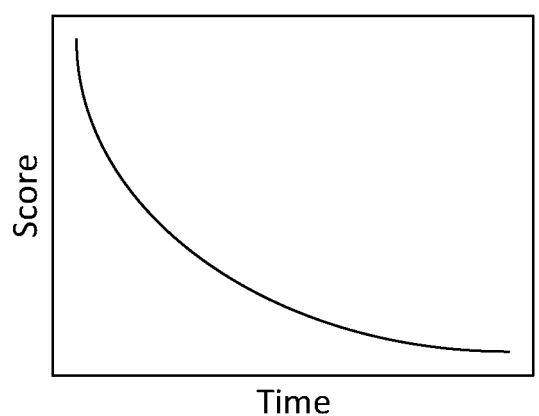
FIG. 6 shows an example of a decay function.

In an example in which the original published date of a video is configured as a rating factor, a maximum possible score may be assigned for this factor if the video was published less than a predetermined amount of time ago. For example, a maximum score may be awarded if the video was first published less than 12 hours ago. As time passes from that threshold, the score for this factor may be decreased. In one example, the decrease may resample an exponential or logarithmic decay function. An example of such a decay function is shown in FIG. 6. Decay functions may be applied to any rating factor or sub-factor where time plays a role and it is desired to place an emphasis on recent-ness of videos.

Rating factors may also be related to the source which originally caused the video to be ingested or the location of the video. Such information may be retrieved in step 402. For example, the number of views of a video at the video location, the number of likes of the video at the video location, and the number of comments on the video at the video location may each be configured as rating sub-factors. Each sub-factor may be assigned a portion of the factor's maximum score. As one example, the number of likes of the video at the video location may account for a third of the original source rating factor and may be calculated on a linear or other scale based on the number of likes the video received compared to a threshold. For example, if a video gets 10,000 likes at YouTube, it may earn the maximum sub-factor score, whereas a video with only 5,000 likes may earn half of the maximum sub-factor score. In this example, likes beyond 10,000 would not add to the video's rating. Similar interpolations may be applied to other sub-factors or factors.

In an example in which the date that the video was first ingested by the VISD system is configured as a rating factor, a maximum possible score may be assigned for this factor if the video was ingested less than a predetermined amount of time ago and the score may decay as described above with respect to the original published date.

Feedback from VISD system users may also be included in the rating process 403. For example, as described above with respect to the source which originally caused the video to be ingested or the location of the video, the VISD system may also provide for user interaction in which users comment, like, view or otherwise interact with the videos in the VISD system. Such interactivity (or sub-elements thereof such as comments, likes and views) may be used as sub-factors in determining a video's rating. As described below, such interactivity may be recorded as events in a user activity database 519f and this user activity database 519f may be queried as a part of the video rating process 403.

A video's rating may also be based in part on factors related to the moments identified for a video. For example, the number of moments may be used as a basis for calculating a moments factor score much in the same way described above with respect to the number of YouTube likes.

A video's rating may also be made unique to each user of the VISD system by introducing a rating factor that is based on the user's activity or preferences. As described above, the VISD system may allow for interactivity by users. Examples of such interactivity include allowing users to like, comment and view videos within the VISD system. The user activity database 519f may be configured to record events of such interactivity by recording the event type (like, view, etc.), the event time, the video VISD UID or third party UID, the VISD user ID (corresponding to an entry in the user database 519e), a moment ID (corresponding to an entry in the moments database 519c), and/or a channel ID of a VISD channel from which the video was viewed. Entries in the user database 519e or the user activity database 519f may also include tags or keywords associated with videos a user likes. As described above, such tags or keywords may be acquired as metadata from third party sources as a part of the video ingest process. Entries in the user database 519e or the user activity database 519f may also include information indicating search parameters received from the user and videos delivered to the user.

For determining a user's personalized video rating factor score with respect to a particular video, any of such interactivity data tied to a user may be used. As one example, a user's personalized video rating factor score with respect to a particular video may be calculated based on the number of matches between tags or keywords associated with the video being ranked and the tags and keywords associated with videos that the user has liked before in the VISD system. In another example, a user's personalized video rating factor score with respect to a particular video may be calculated based on the number of matches between a video category (obtained from metadata from the video's source) associated with the video being ranked and the video category (obtained from metadata from the video's source) associated with videos that the user has liked before in the VISD system. Of course, this calculation may be configured to take time into account and emphasize or exclusively use interactivity events that have occurred recently.

Filter/Search and Delivery

As shown in FIG. 1, once a video is ingested 101, analyzed 102, and rated 103, it is ready for filtering and searching 104. This work flow may be accomplished by, for example, a search and filtering component 546 and a delivery component 546. Various attributes from the VISD databases may be indexed for searching by a user or for filtering to compile VISD channels. In one example, indexed attributes include the text of moments from the moments database 519c, the VISD channel associated with the video, and the title, description, and category of videos from the metadata in the videos database 519b. Indexing and search processes may be performed outside of the VISD system by a third party provider such as Algolia.

A search process may be configured to search the various databases in a preconfigured order. Also, search results may be displayed in a preconfigured order. For example, search results may be displayed first sorted by class (such as by displaying videos and moments separately) and then ordered by rating and then (or alternatively) ordered by time of the moment or time of publication of a video, for example. The order in which the search results are returned may dictate the order in which videos are delivered to a user.

Search results or the entire video and moments libraries may be filtered or faceted according to any of the attributes described herein. For example, videos and moments may be filtered based on the source of the video (YouTube, Reddit, Twitter, Facebook, etc.), whether the item is a moment or a video, the video category or associated keywords (obtained from metadata from the video's source or location), VISD channel associated with the video, and the text of moments.

VISD channels may be established by users or may be preconfigured in the VISD system. Users may establish their own VISD channels simply by saving the search parameters for a search (as described above) and reapplying them any time the personalized VISD channel is recalled. Preconfigured VISD channels may also be established by saving predefined searches or may also be defined based on third party metadata, such as a video's category as defined by the video's source or location. VISD channels may be configured to appear to the user as an ordered list of videos, the order of the videos being determined by the order in which the video search results are returned. When a user elects to play a VISD channel or videos returned as a result of a search, videos may be delivered one after the other in the order in which the video search results are returned.

Ultimately, videos are delivered to a user 105 based on their search parameters or VISD channel selection. As described above, users' activity, including their searches and videos delivered to the user, may be tracked by creating entries in the user 519e and user activity 519f databases. Moments may be displayed along with or over top of videos. Moments may be dynamically displayed and hidden based on their associated timestamp and the progression of the video being delivered at a given point in time so that the text of a moment is displayed at the time of the moment as the video is being delivered.

It should be noted that the entire workflow depicted in FIG. 1 may be configured as a re-iterative workflow and may be continuously and asynchronously executed. For example, videos may be being rated 103 at the same time others are being ingested 101. Likewise, videos may be ingested 101 at fixed time intervals or continuously.

VISD Controller

Figure 5:
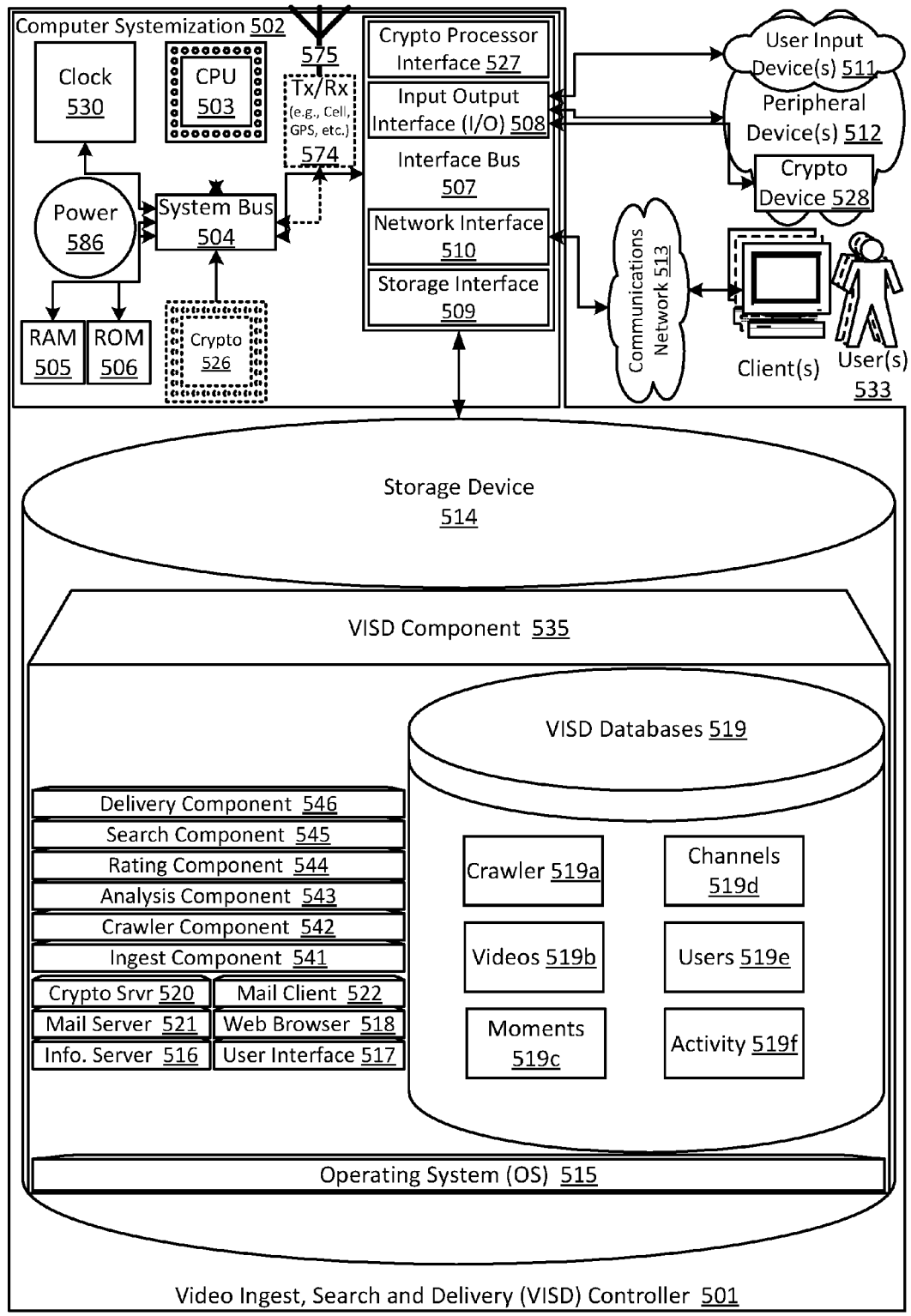
FIG. 5 shows a block diagram illustrating embodiments of a VISD controller.

FIG. 5 shows a block diagram illustrating embodiments of a VISD controller. In this embodiment, the VISD controller 501 may serve to aggregate, process, store, search, serve, identify, instruct, generate, match, and/or facilitate interactions with a computer, and/or other related data.

Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the VISD controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The VISD controller 501 may be based on computer systems that may comprise, but are not limited to, components such as: a computer systemization 502 connected to memory 529.

Computer Systemization

A computer systemization 502 may comprise a clock 530, central processing unit ("CPU(s)" and/or "processor(s)" (these terms are used interchangeably throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing VISD controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the VISD controller and beyond through various interfaces. Should processing requirements dictate a greater amount speed and/or capacity, distributed processors (e.g., Distributed VISD), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the VISD may be achieved by implementing a microcontroller such as CAST's R8051XC2 microcontroller; Intel's MCS 51 (i.e., 8051 microcontroller); and/or the like. Also, to implement certain features of the VISD, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the VISD component collection (distributed or otherwise) and/or features may be implemented via the microprocessor and/or via embedded components; e.g., via ASIC, coprocessor, DSP, FPGA, and/or the like. Alternately, some implementations of the VISD may be implemented with embedded components that are configured and used to achieve a variety of features or signal processing.

Depending on the particular implementation, the embedded components may include software solutions, hardware solutions, and/or some combination of both hardware/software solutions. For example, VISD features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the VISD features. A hierarchy of programmable interconnects allow logic blocks to be interconnected as needed by the VISD system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the VISD may be developed on regular FPGAs and then migrated into a fixed version that more resembles ASIC implementations. Alternate or coordinating implementations may migrate VISD controller features to a final ASIC instead of or in addition to FPGAs. Depending on the implementation all of the aforementioned embedded components and microprocessors may be considered the "CPU" and/or "processor" for the VISD.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the VISD thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the VISD controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed VISD), architectures may similarly be employed to pool, load balance, and/or otherwise increase the communicative bandwidth required by the VISD controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the VISD controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the VISD controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the VISD controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the VISD controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the VISD component(s) 535; the ingest component 541; the crawler component 542, the analysis/moment creation component 543; the rating component 544; the search/filtering component 545; the delivery component 546; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like. Also, while the components are described separately herein, it will be understood that they may be combined and/or subdivided in any compatible manner.

Operating System

The operating system component 515 is an executable program component facilitating the operation of the VISD controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the VISD controller to communicate with other entities through a communications network 513. Various communication protocols may be used by the VISD controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the VISD controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the VISD databases 519, operating systems, other program components, user interfaces, Web browsers, and/or the like.

Access to the VISD database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the VISD. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the VISD as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the VISD enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the VISD. Mail may also take the form of messages sent from one VISD user to another that is not in the form of traditional email but is more akin to direct messaging or the like conventionally enabled by social networks.

Access to the VISD mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the VISD may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the VISD component to engage in secure transactions if so desired. The cryptographic component facilitates the secure accessing of resources on the VISD and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The VISD Databases

The VISD databases component 519 may be embodied in one database and its stored data or may be embodied in two or more distinct databases and their stored data. For the purposes of simplicity of description, discussion of the VISD databases component 519 herein may refer to such component in the singular tense, however this is not to be considered as limiting the VISD databases to an embodiment in which they reside in a single database. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the VISD database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the VISD database is implemented as a data-structure, the use of the VISD database 519 may be integrated into another component such as the VISD component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 may include several included databases or tables 519*a-f*, examples of which are described above.

In one embodiment, the VISD database 519 may interact with other database systems. For example, employing a distributed database system, queries and data access by a search VISD component may treat the combination of the VISD databases 519, an integrated data security layer database as a single database entity.

In one embodiment, user programs may contain various user interface primitives, which may serve to update the VISD. Also, various accounts may require custom database tables depending upon the environments and the types of clients the VISD may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-f*. The VISD may be configured to keep track of various settings, inputs, and parameters via database controllers.

The VISD database may communicate to and/or with other components in a component collection, including itself, and/or facilities of the like. Most frequently, the VISD database communicates with the VISD component, other program components, and/or the like. The database may contain, retain, and provide information regarding other nodes and data.

The VISDs

The VISD component 535 is a stored program component that is executed by a CPU. In one embodiment, the VISD component incorporates any and/or all combinations of the aspects of the VISD that was discussed in the previous figures. As such, the VISD affects accessing, obtaining and the provision of information, services, transactions, and/or the like across various communications networks. The features and embodiments of the VISD discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the VISD's features and facilities, and in many cases reduce the costs, energy consumption/requirements, and extend the life of VISD's underlying infrastructure; this has the added benefit of making the VISD more reliable. Similarly, many of the features and mechanisms are designed to be easier for users to use and access, thereby broadening the audience that may enjoy/employ and exploit the feature sets of the VISD; such ease of use also helps to increase the reliability of the VISD. In addition, the feature sets include heightened security as noted via the Cryptographic components 520, 526, 528 and throughout, making access to the features and data more reliable and secure.

The VISD component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the VISD server employs a cryptographic server to encrypt and decrypt communications. The VISD component may communicate to and/or with other components in a component collection, including itself, and/or facilities of the like. Most frequently, the VISD component communicates with the VISD database, operating systems, other program components, and/or the like. The VISD may contain, communicate, generate, obtain, and/or provide program component, system, user, and/or data communications, requests, and/or responses.

Distributed VISDs

The structure and/or operation of any of the VISD node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the VISD controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the VISD controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
    .IBMDI.doc/referenceguide295.htm and other parser implementations:

http://publib.boulder.ibm.com/infocenter/tivihelp/v2r1/index.jsp?topic=/com.ibm
    .IBMDI.doc/referenceguide259.htm all of which are hereby expressly incorporated by reference.

In order to address various issues and advance the art, the entirety of this application for VIDEO INDEXING, SEARCH AND DELIVERY PLATFORMS, METHODS, SYSTEMS AND APPARATUSES (including the Cover Page, Title, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a VISD individual and/or enterprise user, database configuration and/or relational model, data type, data transmission and/or network framework, syntax structure, and/or the like, various embodiments of the VISD, may be implemented that enable a great deal of flexibility and customization. For example, aspects of the VISD may be adapted for video, audio or any other content. While various embodiments and discussions of the VISD have included video and social interaction, however, it is to be understood that the embodiments described herein may be readily configured and/or customized for a wide variety of other applications and/or implementations.

What is claimed is:

1. A method for ingesting and delivering video comprising:
   crawling, by a crawler component executed by a processor, one or more predetermined video reference sources and selectively ingesting, by an ingest component executed by a processor, one or more videos and their metadata based on predetermined ingest criteria;
   analyzing the ingested videos, by an analysis component executed by a processor, to identify moments in the video by parsing comments relating to the video, identifying a moment if a comment includes a reference to a time in the video and storing the time and a text of the comment in a record of the moment; and
   delivering videos, by a delivery component executed by a processor, and dynamically displaying and hiding moments associated with videos being delivered over top of the videos based on times of the moments and a delivery progression of their associated videos.

2. The method of claim 1, wherein dynamically displaying moments includes displaying moments together with their associated videos by displaying text of a particular moment at the time of the particular moment.

3. A method for ingesting and delivering video comprising:
   crawling, by a crawler component executed by a processor, one or more video reference sources for references to videos that meet predetermined ingest criteria, the predefined ingest criteria including at least an identification of video reference sources to crawl and a limitation as to permissible video locations;
   ingesting, by an ingest component executed by a processor, at least one video identified by the crawler component as meeting the predefined ingest criteria from a permissible video location and metadata about the at least one video from both the permissible video location and a video reference source from which the crawling component identified the at least one video;
   analyzing the ingested videos, by an analysis component executed by a processor, to identify moments in the videos by parsing comments in the metadata relating to the videos, identifying a moment if a comment includes a reference to a time in the video and storing the time and a text of the comment in a record of the moment; and
   delivering videos together with moments associated with the videos by a delivery component executed by a processor by dynamically displaying and hiding moments associated with videos being delivered over top of the videos based on times of the moments and a delivery progression of their associated videos.

4. The method of claim 3, further comprising after a video and its metadata is first ingested, ingesting additional metadata for the video that is dated after a last time that metadata was ingested for the video.

5. The method of claim 4, further comprising identifying additional moments in the additional metadata, identifying an additional moment if a comment in the additional metadata includes a reference to a time in the video and storing the time and a text of such a comment in a record of the additional moment.

6. The method of claim 5, further comprising comparing the time, the text and an identification of a user associated with a comment in the additional metadata with already stored records of moments and only storing a new moment corresponding to the comment in the additional metadata if there is no match.

7. The method of claim 5, wherein delivering videos together with moments associated with the videos includes delivering videos together with moments and additional moments associated with the videos.

8. The method of claim 3, wherein the predetermined ingest criteria include at least whether at least one comment at one of a predetermined set of one or more reference sources contains a reference to a time in a video.

9. The method of claim 3, further including ingesting metadata about the at least one video from a metadata location that is defined in the predetermined ingest criteria and that is different than the video location and the video reference source.

10. A method for ingesting and delivering video comprising:
- crawling, by a crawler component executed by a processor, one or more predetermined video reference sources and selectively ingesting, by an ingest component executed by a processor, one or more videos and their metadata based on predetermined ingest criteria;
- analyzing the ingested videos, by an analysis component executed by a processor, to identify moments in the video by parsing comments relating to the video, identifying a moment if a comment includes a reference to a time in the video and storing the time and a text of the comment in a record of the moment;
- rating, by a rating component executed by a processor, the ingested videos according to predetermined rating factors, at least one of which is based on any moments identified in the video; and
- selectively delivering videos, by a delivery component executed by a processor, based on results of the rating step and dynamically displaying and hiding moments associated with videos being delivered over top of the videos based on times of the moments and a delivery progression of their associated videos.

11. The method of claim 10, wherein the predetermined rating factors include at least the total number of moments identified for the video.

12. The method of claim 10, wherein the predetermined rating factors include at least the total number of comments for the video.

13. The method of claim 10, further comprising:
- searching at least the text of moment records based on search parameters received from a user;
- selectively delivering videos based on the results of the searching step in order of their rating as determined by the rating step.

14. The method of claim 13, further comprising after a video and its metadata is first ingested, ingesting additional metadata for the video that is dated after a last time that metadata was ingested for the video.

15. The method of claim 14, further comprising identifying additional moments in the additional metadata, identifying an additional moment if a comment in the additional metadata includes a reference to a time in the video and storing the time and a text of such a comment in a record of the additional moment.

16. The method of claim 14, further comprising rating the video after ingesting the additional metadata based on all metadata ingested for the video.

17. The method of claim 13, further comprising:
- identifying additional moments in the additional metadata, identifying an additional moment if a comment in the additional metadata includes a reference to a time in the video and storing the time and a text of such a comment in a record of the additional moment;
- re-rating the video after ingesting the additional metadata based on all metadata ingested for the video;
- storing the search parameters received from the user as a channel;
- in response to the receipt of a selection of a channel from a user, re-searching at least the text of moment records and the additional moment records based on search parameters stored in association with the channel; and
- selectively delivering videos based on the results of the re-searching step in order of their rating as determined by the re-rating step.

* * * * *